United States Patent [19]

Lopez

[11] Patent Number: 4,740,301

[45] Date of Patent: Apr. 26, 1988

[54] APPARATUS FOR PURIFYING WATER, ESPECIALLY SALT WATER, BY REVERSE OSMOSIS

[76] Inventor: Fernand Lopez, 27, rue Emile Barrière, 31200 Toulouse, France

[21] Appl. No.: 940,736

[22] Filed: Dec. 11, 1986

[30] Foreign Application Priority Data

Dec. 11, 1985 [FR] France .................................. 85 18460

[51] Int. Cl.$^4$ ............................................. B01D 13/01
[52] U.S. Cl. ................................................. 210/321.87
[58] Field of Search ................................ 210/652–655, 210/321.1, 321.2, 321.5, 257.2, 433.2

[56] References Cited

U.S. PATENT DOCUMENTS 4,070,280  1/1978  Bray .................................. 210/321.1

Primary Examiner—Ivars Cintins

Attorney, Agent, or Firm—Harold H. Dutton, Jr.

[57] ABSTRACT

The invention concerns an apparatus for purifying primary water so as to produce in batchwise manner potable fresh water by reverse osmosis in the course of discontinuous operational stages. This apparatus comprises a primary-water chamber (3), a stopper (7) to fill it, a potable-water collecting connector (12) and stub, a semi-permeable membrane (10) housed in the chamber (3), a movable piston (15) which may enter said chamber between a retracted position and a maximum penetration position, and mechanical means to drive the piston which include an intake handcrank (23), two meshing gears (18, 22) and a screw (17) driven by one of the gears and supporting the piston. The dimensions of the chamber (3) are such that its total available capacity ($V_1$) is at least three times the volume ($V_2$) swept by the piston in its displacement between the retracted and the maximum-penetration positions.

12 Claims, 5 Drawing Sheets

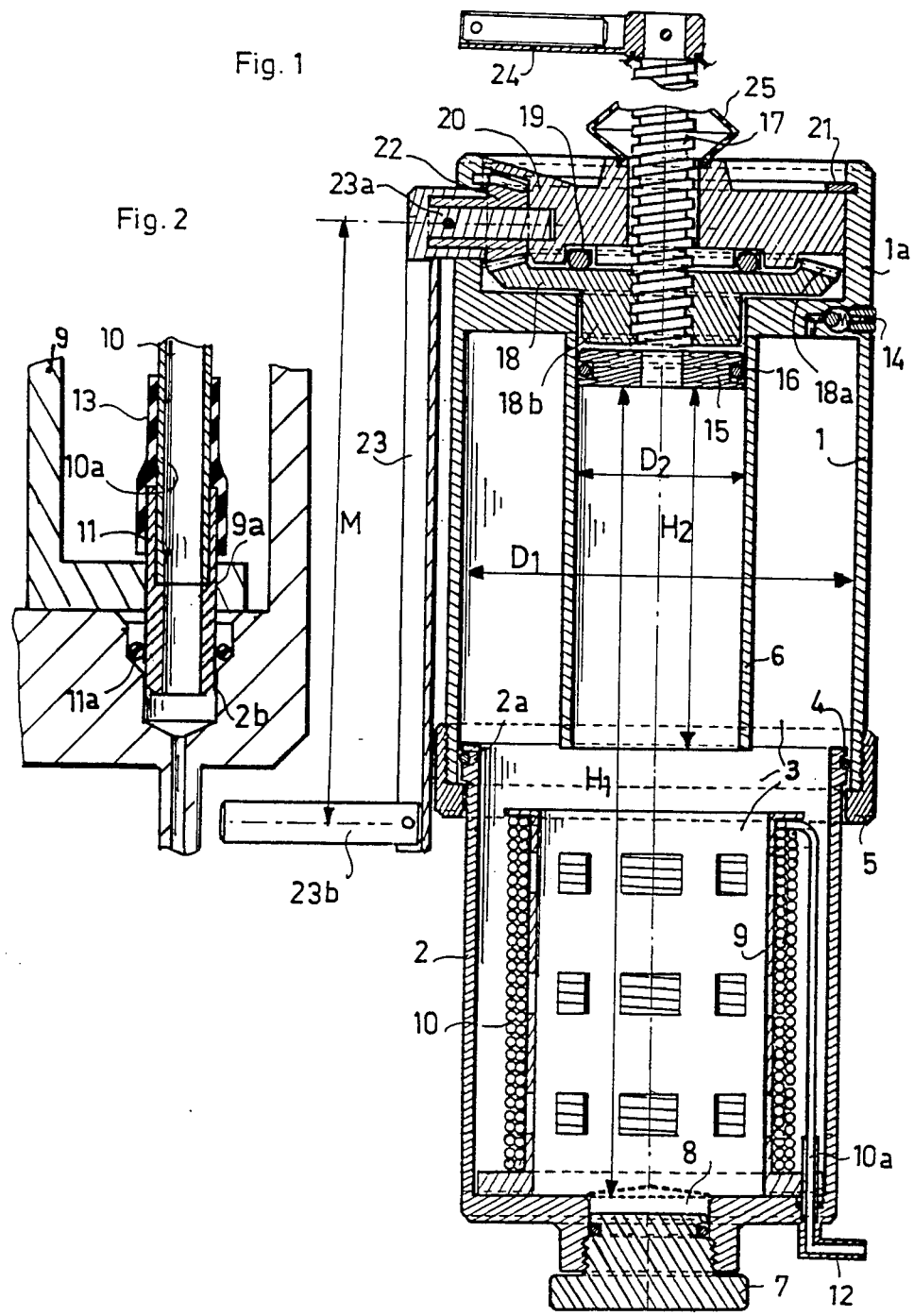

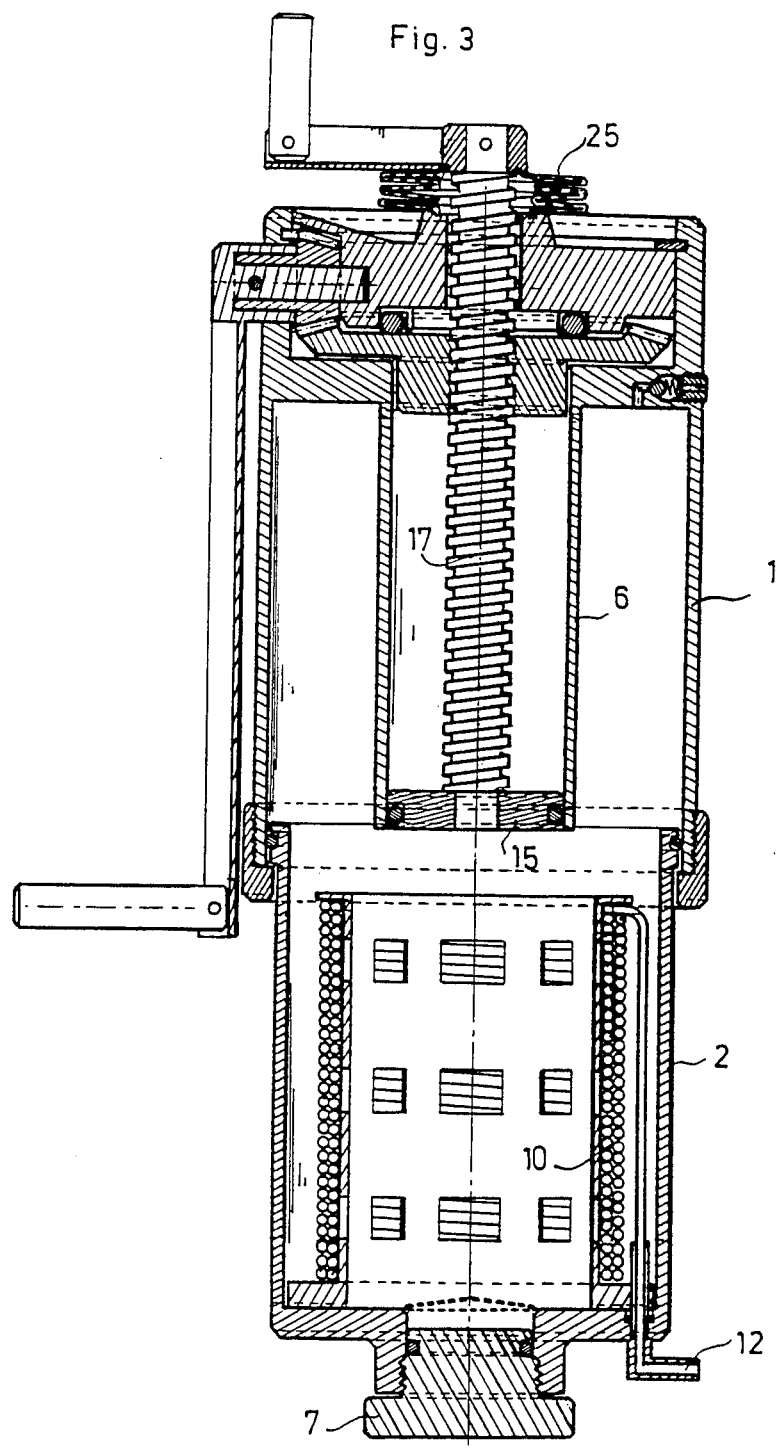

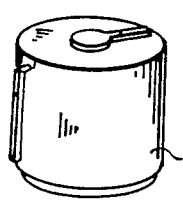
Fig. 5a
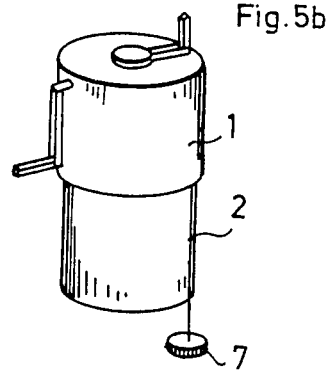
Fig. 5b
Fig. 5c
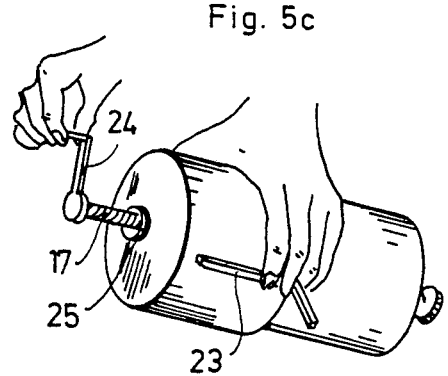
Fig. 5d
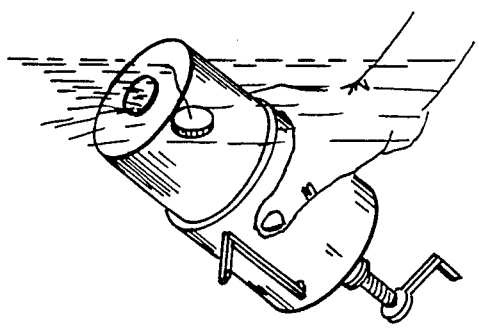
Fig. 5e
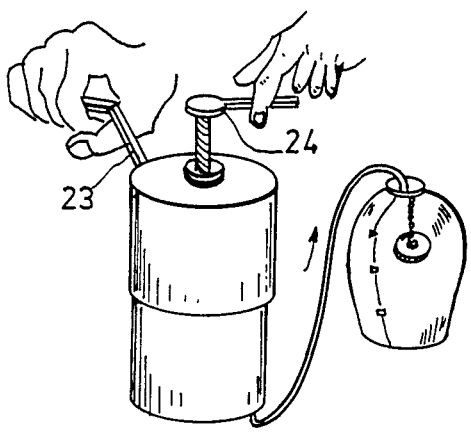
Fig. 5f
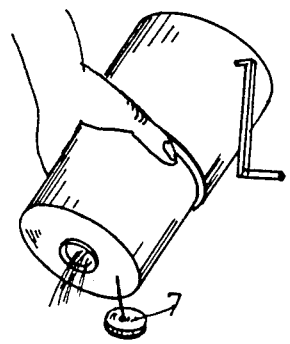

APPARATUS FOR PURIFYING WATER, ESPECIALLY SALT WATER, BY REVERSE OSMOSIS

This invention relates to an apparatus for purifying water, in particular saline water, which hereafter will be referred to as "primary water", in order to produce potable fresh water. The invention provides an apparatus of the type in which the purification is produced, by reverse osmosis, batch by batch, during discontinuous operational stages.

It is known to make use of selective semi-permeable membranes for reverse osmosis when purifying water and making it potable. This mode of purification offers the advantage of combining multiple separations into one operation: elimination of most of the dissolved substances such as salt, suppression of bacterial pollution, elimination of colloids or other ingredients that might affect the chemical quality, the odor, the color and the taste of the waters. It is known that this kind of filtration requires applying a high pressure to the primary water which exceeds the osmotic pressure characterizing the concerned water in order to make it pass through the semi-permeable membrane and to assure filtration. Illustratively, for sea water with a salinity of 35 g/l, the osmotic pressure is about 25 bars, whereas for a brine with a salinity of 10 g/l the osmotic pressure is about 7 bars. Pressures about 3 to 4 times higher as a rule are required to provide satisfactory filtration rates.

During a first stage of research between 1965 and 1975, an attempt was made to arrive at simple apparatus, in particular for manual operation, to carry out the above method. Devices of that type are illustrated in the French Pat. No. 1,474,929 of Feb. 15, 1966, in German Pat. No. 1,517,523 of Dec. 9, 1966 and British Pat. No. 1,436,111 of Mar. 24, 1972. However it appears that such concepts did not lead to efficacious implementation because the apparatus discussed in those patents do not all combine the conditions required for practicality, namely high-level performance, compactness and ease of operation. Some of these devices appear to fall short of reaching the necessary pressures. Others are likely to rapidly and irreversibly clog so that the membranes will be entirely inoperative. Still others require a pressure which rapidly increases in operation and thereby rapidly become manually impractical. It should be noted in this respect in the device of French Pat. No. 1,474,929 and the first embodiment of British Pat. No. 1,436,111, that there are provided manual means for continuously pumping primary water as well as an elastic pouch in the purification chamber filled with pressurized gas. It appears that these means, which are associated with an expulsion of primary water, are intended to generate a flow of water at the membrane surface to prevent the salinity from increasing. Nevertheless the efficiency of this system appears unsatisfactory because it is intrinsically complex such that its cost is incompatible with a small device for personal use, for instance for survival devices for individuals in a hostile environment (for purifying brackish water) or for shipwrecked persons on an emergency float (seawater purification).

After 1977, these difficulties led reverse-osmose experts to more closely analyze the problem. They all considered a solution whereby a powerful and continuous flow of primary water was created near the semipermeable membrane using pumping units to expel the super-concentrated primary water. The present state of the art is illustrated by French Pat. Nos. 2,342,252 of Feb. 25, 1977, 2,385,427 of Mar. 24, 1978, U.S. Pat. No. 4,187,173 of Mar. 14, 1978, European Pat. No. 0,018,128 of Apr. 1, 1980 and European Pat. No. 0,059,275 of Feb. 27, 1981. One research approach disclosed by these documents comprises recovering part of the expelled pressurized water energy for use in compressing the primary water. However these hydraulic devices have become extremely complex and very costly.

It should be noted that these continuously operating devices as a rule are equipped with motorized pumping units but that some patents discuss manual actuation by a lever moving back and forth, (in particular the U.S. Pat. No. 4,187,173). To the knowledge of applicant, this manual device is practically marketed in the form of a portable desalting apparatus, but its price, which at the present exceeds 20,000 FF, should substantially restrict its use. Moreover its weight (6 kg) and its bulk (length=76 cm) preclude it from transport by an individual on land.

For the sake of completeness, another desalting device used at sea can be mentioned, where the pressure exerted on the water to be desalted is no longer produced mechanically but by immersing the apparatus to a suitable depth in the marine medium. Such apparatus however is inapplicable on land, obviously.

The object of the present invention is a purifying apparatus using reverse osmosis and with mechanical means to generate the required pressure so as to be applicable both on land to purify brackish waters and at sea to purify seawater.

Another object of the invention is to create an apparatus with a simple structure and with a bulk and cost suitable for individual carriage and use.

Still another object is to produce potable fresh water at very moderate exertion generated by any individual even if exhausted.

To that end, the applicant has left the approach followed for 10 years by the recent research and has considered a discontinuously operated apparatus producing at each stage a batch of fresh water. The activity of the invention therefore selected direction which the experts had previously abandoned or condemned, and in finding an exceedingly simple solution assuring the efficiency of the apparatus based on this principle and meeting the requirements of the application.

The purifying apparatus for primary, and in particular saline, water of the invention comprises: a primary-water chamber extending along one axis and designed to withstand a high pressure exceeding the osmotic pressure of the primary water, means for filling the chamber with primary water before each stage, means for collecting low-pressure, potable water, at least one semi-permeable membrane suitable for reverse-osmose filtration of primary water contained in the chamber, the membrane being located in the chamber so that one of its active sides, called the active upstream side, is immersed in the primary water of the chamber, and so that its other active side, called the active downstream side, communicates with the means collecting the potable water, a movable piston arranged to axially enter the chamber on a stroke between a retracted position and a maximum penetration position, and designed in such a manner that the volume ($V_2$) swept by the piston in its displacement be slight compared to the total available capacity ($V_1$) of the chamber.

The apparatus of the present invention comprising: the chamber containing a coaxial sleeve within which the piston may move in impermeable manner, the semi-permeable membrane being located in a peripheral annular portion of the chamber so as to open its central portion to the coaxial sleeve, a rotary drive member, called the intake member, hinging externally on a shaft near one end of the chamber to rotate in a plane parallel to this chamber's axis, a first bevel gear resting on the hinge shaft of the intake member so as to rotate with it, a second gear with a larger diameter is coaxial with the chamber and outside it in the intermediate vicinity of its end, this second gear being bevelled and meshing with the first bevel gear and comprising a threaded axial hole, centering and stop means which are associated with the second gear to keep it axially engaged with the first gear, a screw extends along the chamber and sleeve axis to enter the threaded hole of the second gear, this screw bearing the piston, the screw is provided with key-means to prevent it from rotating.

The expression "total available capacity $V_1$" means the difference between the total chamber volume when the piston is retracted and the volume occupied by the semi-permeable membrane (and where applicable plus any other accessory in the chamber): this capacity $V_1$ therefore is the volume of primary water which initially can be introduced into the chamber.

Preferably the chamber and the piston are so arranged that the ratio $V_1/V_2$ of the total available chamber volume to the volume swept by the piston exceed 3 and in particularly be between 4 and 12, for instance about 6 to 8.

Experiment has shown that discontinuous operation providing batchwise production of potable water will be highly efficient when using an apparatus combining the means of the invention and in the absence of any accessories to create a flow of primary water. The mechanical means are arranged at one end of the primary-water chamber to provide a compact apparatus highly suitable for the requirements of the application. In particular, with suitable sizing on one hand, these means permit a force multiplication between an intake member (in particular a handcrank) and a screw of about 500 to 1,500, and on the other hand, a motion reduction such that one revolution of the intake member causes a screw displacement of 0.5 to 2 mm.

Accordingly a user applying a very moderate power (for instance less than 20 watts) to the intake member may through these mechanical means and the piston develop the required pressures on the primary water. As regards brackish water, the piston and the mechanical means are easily adapted to generate pressures between 20 and 30 bars from powers less than 20 watts. These means also are suitable to purify seawater, in which case they are adapted to generate pressures between 50 and 80 bars from powers below the same threshold. (Obviously, the shaft of the intake member may also be driven by an illustratively electrical motor).

In another advantageous feature of the invention, the primary-water chamber is telescoping and comprises of two cylindrical enclosures impermeably sliding within each other between a retracted and an extended position. This means is combined with the set of above described means to make possible simultaneously a primary-water chamber with a volume large compared to the desired batch of potable water from each stage and an inactive apparatus of low bulk.

When being moved or stored, the two enclosures are retracted into each other. Before each use, the operator extends these enclosures to provide the capacity $V_1$ required for operation to the primary-water chamber.

In a preferred embodiment, the chamber assumes a generally cylindrical shape and the piston cross-section is less than that of the chamber. Let $D_2$ be the piston diameter and $H_2$ the chamber height it sweeps, then the chamber will be advantageously sized provided that $$1.6H_2 \leq H_1 \leq 2.4H_2$$

and $$1.6D_2 \leq D_1 \leq 2.4D_2,$$

where $H_1$ and $D_1$ respectively are the total chamber height and its mean diameter.

The semi-permeable membrane for reverse osmosis may be any known type. In particular it may be a known tubular membrane (made of cellulose acetate, of aromatic polyamides, or others), which is coiled within the primary-water chamber; the active upstream side of this membrane comprises the outer side of the tube forming it and is immersed in the primary water contained in the chamber, while the active downstream side comprises the inner side of the membrane and communicates with means collecting the potable water to ensure that the filtered potable water flows toward those means. These collecting means in particular include on one hand an outer connector extending by a duct through the chamber wall and on the other hand at least one tubular stub located inside this duct; this stub is designed to keep in place one end of the tubular member so that its active downstream side (inner side) communicate with the outer connector. The other end of the semi-permeable membrane may be sealed so that the potable water shall flow only through one end; this other end too can be fixed on another stub in the same manner as the first end to allow filtered water to flow through the two ends.

In another feature of the invention, piston return means is advantageously provided to rapidly move it from its maximum-penetration position to its retraction position between two operational stages.

Other features, purposes and advantages of the invention will become clearer in relation to the following description and referring to the attached drawings showing illustratively but without thereby implying limitation two modes of embodiments and being an integral part of the present specification.

FIG. 1 is a an axial cross-sectional view of a first embodiment, the filtration sequence being assumed to be at the beginning;

FIG. 2 is a detailed crosssection;

FIG. 3 is an axial cross-sectional view of the apparatus at the end of a filtration stage;

FIGS. 5a, 5b, 5c, 5d, 5e, 5f are diagrams illustrating the use of the apparatus;

Figure 4:
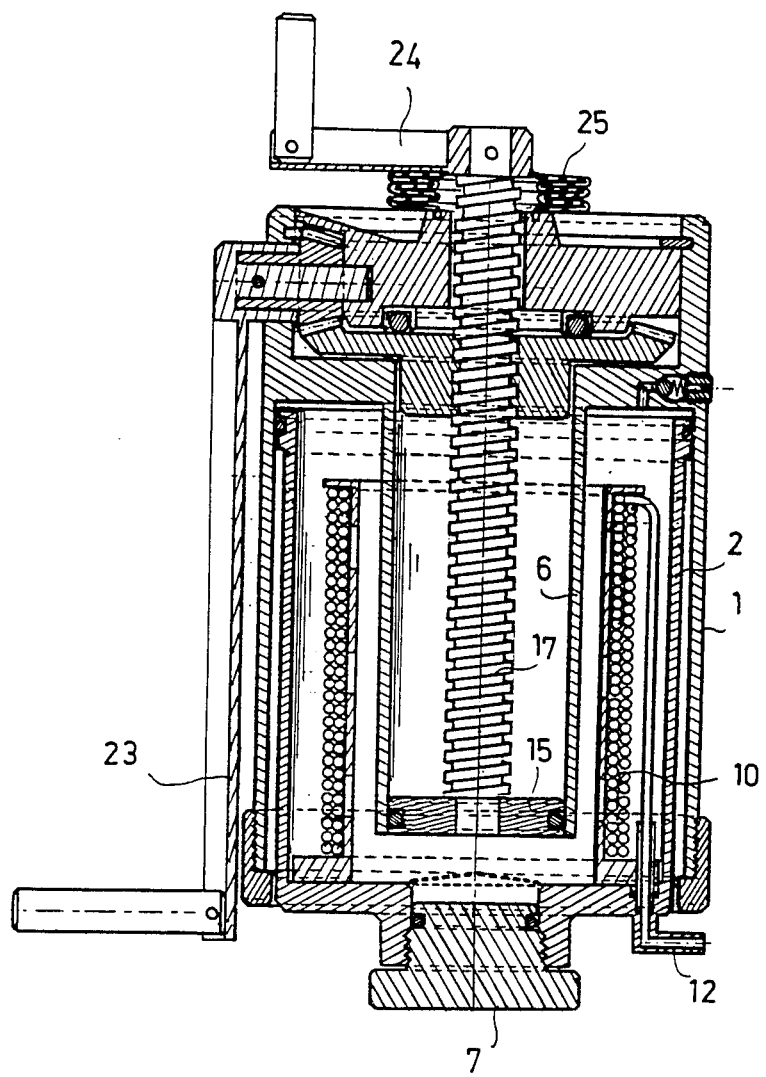
FIG. 4 is a similar sectional view showing the apparatus after its enclosures have been retracted into each other for transportation.

The illustratively shown apparatus of FIGS. 1, 2, 3 and 4 has a total bulk when retracted at about 1.5 liters (and is shown in these Figures on a scale of about 0.7). In particular it is to supplement an individual's gear when on land in order to provide him with fresh water from polluted and/or brackish waters (salinity: 10 g/l) illustratively obtained from marshes, wells, ponds, etc.

This apparatus has two cylindrical enclosures 1 and 2 telescoping into each other and designed to withstand a pressure of about 100 bars. These enclosures are mutually opposite by their open ends and are arranged so that their axes be colinear, whereby the second enclosure 2 can impermeably slide within the first enclosure 1 between a retracted position (FIG. 4) and an extended position (FIGS. 1 and 3).

In the latter position, the two enclosures bound a chamber, called the primary-water chamber 3. In this example, the depth of each enclosure is nearly the same to make possible complete retraction of the enclosure 2 into the enclosure 1.

To assure impermeability, the second enclosure 2 is provided along a peripheral collar 2a with an O-ring 4 cooperating with the inside wall of the first enclosure. This first enclosure is provided with a ring 5 screwed on its end to act as a motion stop for the extended position.

The first enclosure 1 continues at its other end by an annular rim 1a and is provided on the inside with a coaxial sleeve 6 stretching along its height. The bore of this sleeve has a diameter $D_2$ which may be about half the mean diameter $D_1$ of the chamber 3. This sleeve 6 is open at both ends, namely toward the enclosure 2 and outside the enclosure 1.

The bottom of the second enclosure 2 is perforated with a large filling hole sealed by a removable stopper 7 screwed into it. This hole furthermore bears a prefiltering capsule symbolically shown at 8 that can stop any large particles suspended in the introduced primary water.

The enclosure 2 furthermore includes a trellis-like cylindrical coil 9 stretching along this enclosure around the axial volume located straight below the sleeve 6 and including two end collars. When the two enclosures are retracted, the sleeve 6 therefore will be housed within this coil 9. This coil 9 comprises a tubular braid 10 wound around it and includes a tubular semi-permeable membrane for reverse osmosis, known per se, illustratively made of cellulose acetate. One end 10a of the membrane is associated with means collecting the fresh water obtained within this membrane.

As shown by the detailed FIG. 2, the end 10a of the tubular membrane enters a rigid tubular stub 11 of which the bore corresponds to the outer diameter of the membrane. This stub is provided with an internal stop shoulder for the membrane and is fitted into and bonded to a hole 9a present in the corresponding shoulder of the coil 9; the stub end opposite the membrane enters a duct 2b in the bottom of the enclosure 2. This duct includes a segment of widened diameter seating an O-ring 11a sealing the periphery of the stub 11 between it and the bottom of the enclosure 2. The duct 2b extends into an external hook-up connector 12 that may be equipped with a hose or may directly flow into a container.

A latex sleeve 13 is slipped on the inner projecting part of the stub 11 and on the tubular membrane 10 to provide sealing. It should be noted that this assembly provides excellent sealing which increases with the pressure in the primary-water chamber 3.

The other end of the semi-permeable membrane 10 may be closed; but it is also possible to connect this other end of another stub arranged like the first to assure a flow in both directions in the membrane. Preferably the two studs in that case will issue into the same external connector.

The assembly of coil, membrane and stub may be used as one exchangeable unit to allow easy membrane replacement. It should be noted that the coil may be put in place by snap-in means to keep the assembly as a whole in place.

The first enclosure furthermore is provided with a calibrated valve 14 opening to the outside if the pressure in chamber 3 exceeds a pre-calibrated threshold.

The sleeve 6 of the first enclosure contains a cylindrical piston 15 moving within this sleeve between a retracted position (FIG. 1) and a maximum penetration position (FIG. 3). This piston is equipped on its periphery with an O-ring 16 cooperating with the sleeve bore.

The piston 15 is associated with manual, mechanical drive means so it can be moved between its two positions. During this translation, the piston sweeps the inner volume $V_2$ of the sleeve. This volume is slight compared to the total volume of the primary-water chamber. The batch of potable water produced in each stage equals this volume $V_2$.

Illustratively the height $H_2$ swept by the piston may be about half the total height $H_1$ of the primary water chamber, and the diameter $D_2$ of the piston may also be about half the mean diameter $D_1$ of the chamber. Accordingly the ratio of the total chamber volume to the piston-swept volume is roughly 8. The semi-permeable membrane and the coil supporting it take up a volume which is slight compared to the total chamber volume (about 15 to 20%), whereby the ratio $V_1/V_2$ of the total available capacity of the chamber $V_1$ to the swept volume $V_2$ in this example is much higher than 3 and about 7. Accordingly, at each stage, the produced batch of potable water corresponds to 1/7 of the amount of introduced primary water.

The piston 15 is carried on a screw 17 extending along the axis of the enclosures 1 and 2 and of the sleeve 6. This screw passes through a threaded, axial hole of a gear 18 which is coaxial with the enclosure 1 inside its annular rim 1a. This gear 18 has a bevel toothing 18a on its periphery and a central collar 18b housed in the orifice of the sleeve 6 to center the gear.

Opposite the enclosure 1, this gear 18 is kept in place by a ball thrust bearing 19 fitted into a retaining part 20. This part 20 is perforated axially to let the screw 17 pass freely. This part in turn is retained in the annular rim 1a of the enclosure by a clip 21.

On one side, this part 20 forms a housing in which hinges a bevel gear 22 of lesser diameter than the gear 18.

This gear 22 meshes with the gear 18 and is borne on a hinge shaft 23a solidly joined to an input handcrank 23 and furthermore orthogonal to the axis of the enclosure 1. This handcrank pivots on the annular rim 1a of the enclosure 1 in such a manner that it rotates near this enclosure in a plane parallel to the axis of the enclosure. The gear 22 is keyed into the shaft 23a.

The crank 23 has length M and is provided at its free end with a drive handle 23v screwed in or hinging on it.

In practice, the dimensions of these mechanical drive means advantageously will be such that the force multiplication between crank and screw will be between 500 and 1500 and that the motion reduction will be such that one revolution of the crank generates a screw displacement between 0.5 and 2 mm. As a result, when applying very modest powers (always less than 20 watts), the required pressures can be produced on the piston 15.

The screw 17 furthermore is provided at its free end with a short handle 24 having two functions: on one hand it is a gripping means to lock the screw and to prevent it from rotating during filtration, and on the other hand, it is rapid return means for the piston at the end of each stage.

It should be noted that a bellows 25 is provided, preferable externally, around the screw 17 to protect it when outside the enclosure 1.

Below, the approximate dimensions of an apparatus producing about 1 liter of fresh water in 10 minutes are illustratively shown:

| | |
|---|---|
| Total bulk (retracted state): | 1.5 liters |
| Piston stroke: | |
| total chamber volume: | 10 cm |
| (extended state): | 1.4 l |
| Piston diameter: | 5 cm |
| Volume $V_2$ swept by piston: | 200 cm$^3$ |
| Volume occupies by membrane and coil: | 200 cm$^3$ |
| Total available capacity of chamber $V_1$: | 1,200 cm$^3$ |
| Ratio $V_1/V_2$: | 6 |
| Potable water batch per stage: | 200 cm$^3$ |
| Conversion rate: | 16.6% |
| Screw pitch: | 4 mm |
| Bevel-gear ratio: | 4 |
| Screw motion per revolution of crank 23: | 1 mm |
| Length M of crank: | 15 cm |
| Force multiplication crank/screw: | 940 |
| Crank rated drive speed: | 1 rev/sec |
| Piston pressure: | 30 bars |
| Calibrated pressure for valve 14: | 50 bars |
| Required power: | 6 watts |
| Time of one filtration | 100 s |
| Rated time to drain and fill a chamber: | 20 s |
| Possible hourly production: 30 stages, i.e. 6 liters of potable fresh water. | |

FIGS. 5a through 5f illustrate operating such an apparatus.

FIG. 5a shows the apparatus in its retracted state for carrying or storage. Using composite material, its empty weight can be kept to less than 2 kg.

FIG. 5b shows the extension of the enclosure 1 and 2, with the stopper 7 removed.

FIG. 5c shows the step of rapid return of the screw 17 from the maximum penetration position toward its retracted position by driving the short handle 24 and by keeping in place the crank 23.

FIG. 5d shows how the primary-water chamber is filled.

FIG. 5e shows the filtration stage which lasts about 100 seconds. The operator drives the crank 23 and keeps the handle 24 in place. If the rotation is too rapid, the valve 14 lets primary water escape and the operator must slow down.

Lastly, FIG. 5f illustrates the draining of the chamber between two filtration stages.

Figure 6:
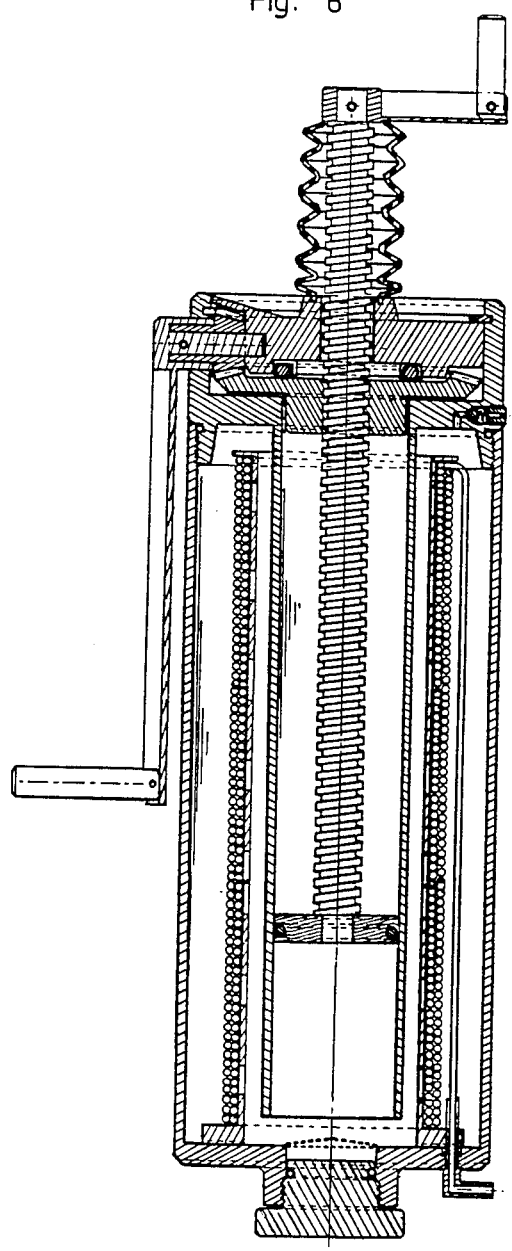
FIG. 6 is an axial cross-sectional view of another embodiment.

FIG. 6 shows another embodiment wherein the primary-water chamber is bounded by a single enclosure. This apparatus is elongated, so that it can be easily incorporated into pleasure-boating survival gear to desalt seawater (35 g/l salinity).

Illustratively its characteristics are the following:

| | |
|---|---|
| Total bulk: | 1.6 liter |
| Total chamber volume: | 1 l |
| Piston stroke: | 20 cm |
| Piston diameter: | 2.5 cm |
| Volume $V_2$ swept by piston: | 100 cm$^3$ |
| Volume taken up by membrane and coil: | 200 cm$^3$ |
| Total available capacity of chamber: | 800 cm$^3$ |
| Ratio $V_1/V_2$: | 8 |
| Potable water batch per filtration stage: | 100 cm$^3$ |

-continued

| | |
|---|---|
| Conversion rate: | 12.5% |
| Screw pitch | 4 mm |
| Bevel-gears ratio: | 4 |
| Screw motion per revolution of crank 23: | 1 mm |
| Crank length M: | 15 cm |
| Force multiplication crank/screw | 40 |
| Rate drive speed for crank: | 1 rev/sec |
| Piston pressure | 60 bars |
| Calibrated pressure of valve 14: | 80 bars |
| Required power | 3 watts |
| Time of one filtration stage: | 200 s |
| Rated time to drain and fill the chamber: | 30 s |
| Possible hourly production: 15 stages, i.e. 1.5 liters of potable fresh water. | |

I claim:

1. An apparatus for purifying primary, saline water by reverse osmosis for batchwise production of potable water comprising a primary water chamber (3) extending along an axis and capable of withstanding pressure greater than the osmotic pressure of said primary water, means for filling said chamber with primary water, means for collecting potable water at low pressure, at least one semi-permeable membrane (10) capable of filtering primary water contained in said chamber (3) by reverse osmosis, said membrane being positioned in said chamber so that an upstream active side thereof is immersed in said primary water and a downstream active side thereof is in communication with said collecting means, a piston (15) axially positioned in said chamber (3) and movable between a retracted position and a maximum penetration position, the ratio of the total available volume ($V_1$) of said chamber to the the volume ($V_2$) swept by said piston during displacement is at least about 3, said chamber containing a coaxial sleeve (6) within which said piston moves between said positions, a rotary drive input member (23) mounted on a shaft (23a) near one end of said chamber so as to be capable of rotating in a plane parallel to the axis of said chamber a first gear (22) secured to said shaft so as to rotate therewith, a second gear (18) mounted on a threaded shaft (17) coaxial with said chamber and in engagement with said first gear, centering means and stop means associated with said second gear for maintaining said second gear in mesh with said first gear, said threaded shaft being secured to said piston, whereby rotation of said drive input member causes axial translation of said threaded shaft and said piston.

2. A purifying apparatus as in claim 1, and wherein said primary water chamber (3) is telescoping and comprises two cylindrical enclosures (1,2) arranged to slide within each other between a retracted position and an extended position, the two enclosures when in the extended position comprising the primary-water chamber with a total capacity $V_1$.

3. A purifying apparatus as in claim 2, and wherein said chamber (3) has a generally cylindrical shape of total height $H_1$ and of mean diameter $D_1$ such that $$1.6H_2 \leq H_1 \leq 2.4H_2$$

and $$1.6D_2 \leq D_1 \leq 2.4D_2$$

where $H_2$ is the chamber-height swept by the piston (15) and $D_2$ is the mean diameter of said piston.

4. A purifying apparatus as in claim 3, and wherein a first of said enclosures includes said coaxial sleeve (6) a second of said enclosures (2) contains the semi-permeable membrane (10) located in a peripheral annular portion of said second enclosure so as to allow the retraction of the two enclosures one into the other.

5. A purifying apparatus as in claim 4, and wherein the filling means comprises a removable stopper (7) sealingly threaded into the bottom of the second enclosure (2).

6. A purifying apparatus as in claim 5, and wherein the semi-permeable membrane (10) is a tubular membrane wound in coils at the peripheral portion of the second enclosure (2) and said collecting means comprises an external connector (12) including a duct (2b) passing through the bottom of the second enclosure (2) and at least one tubular stub (11) in said duct on the inside and designed to retain one end (10a) of the tubular membrane in such a manner that the active downstream side communicates with the external connector.

7. A purifying apparatus as in claim 6, and wherein the intake member (23) comprises a handcrank hinging on an annular rim (1a) extending the first enclosure at the free end thereof so as to be able to rotate near said enclosure, the first gear (22) and the second gear (18) being housed within the annular rim (1a), a screw (17) being provided at the end thereof opposite the piston with a gripper (24) which locks it to prevent it from rotating.

8. An apparatus as in claim 7 for purifying brackish water, and wherein the piston, the intake member, the first gear, the second gear and the screw are constructed so that said piston can generate a pressure between 20 and 30 bars from a power input less than 20 watts applied to the handcrank.

9. An apparatus as in claim 7 for purifying sea water, and wherein the piston, the intake member, the first gear, the second gear and the screw are constructed so that the piston can generate a pressure between 50 and 80 bars from a power input less than 20 watts applied to the handcrank.

10. An apparatus as in claim 9, and wherein the handcrank (23), the two gears (18, 22) and the screw (17) are dimensioned so as to provide a force multiplication between handcrank and screw of 500 to 1500 and to assure such a motion demultiplication that one revolution of the intake member causes a screw displacement between 0.5 and 2 mm.

11. A purification apparatus as in claim 7 and including piston return means (24) for generating a rapid return motion between the maximum penetration position and the retracted position.

12. A purifying device as in claim 11 and wherein the gripper preventing the rotation of the screw and the piston return means comprises a short handle (24) secured to the end of said screw.

* * * * *